United States Patent
Oishi

(10) Patent No.: US 8,452,308 B2
(45) Date of Patent: *May 28, 2013

(54) PROGRAM OF MOBILE DEVICE, MOBILE DEVICE, AND METHOD FOR CONTROLLING MOBILE DEVICE

(75) Inventor: Minoru Oishi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,483

(22) Filed: Sep. 28, 2011

(65) Prior Publication Data

US 2012/0077515 A1 Mar. 29, 2012

(30) Foreign Application Priority Data

Sep. 29, 2010 (JP) .................................. 2010-218593
Apr. 19, 2011 (JP) .................................. 2011-093374

(51) Int. Cl.
*H04W 24/00* (2009.01)

(52) U.S. Cl.
USPC .................. 455/456.3; 455/414.1; 455/404.2; 455/456.1; 455/456.2; 455/456.6

(58) Field of Classification Search
USPC .......... 455/414.1, 404.2, 456.1, 456.2, 456.3, 455/456.6
See application file for complete search history.

(56) References Cited

U.S. PATENT DOCUMENTS

| | | | |
|---|---|---|---|
| 6,654,060 B1 | 11/2003 | Kurosawa et al. | |
| 2003/0093675 A1 | 5/2003 | Hibino et al. | |
| 2004/0080625 A1 | 4/2004 | Kurosawa et al. | |
| 2005/0164633 A1* | 7/2005 | Linjama et al. | 455/41.2 |
| 2006/0171357 A1* | 8/2006 | King et al. | 370/331 |
| 2007/0244963 A1 | 10/2007 | Hibino et al. | |
| 2007/0245014 A1 | 10/2007 | Hibino et al. | |
| 2009/0054077 A1* | 2/2009 | Gauthier et al. | 455/456.1 |
| 2009/0227268 A1* | 9/2009 | Sorensson et al. | 455/456.2 |
| 2011/0124350 A1* | 5/2011 | Sukovic | 455/456.3 |
| 2012/0075485 A1* | 3/2012 | Mizutani et al. | 348/207.1 |

FOREIGN PATENT DOCUMENTS

| | | |
|---|---|---|
| JP | 10-200790 | 7/1998 |
| JP | 2002-244831 A | 8/2002 |
| JP | 2003-150354 A | 5/2003 |
| JP | 2008-293356 | 12/2008 |

OTHER PUBLICATIONS

U.S. Appl. No. 13/247,492, filed Sep. 28, 2011.
U.S. Appl. No. 13/247,498, filed Sep. 28, 2011.

* cited by examiner

*Primary Examiner* — Kamran Afshar
*Assistant Examiner* — Khalid Shaheed
(74) *Attorney, Agent, or Firm* — Scully, Scott, Murphy & Presser, P.C.

(57) ABSTRACT

A computer-readable recording device may store a computer program including instructions for causing a computer of a mobile device to operate as: (1) a selecting module that selects, based on first information, second information and third information, a particular device being substantially located in a specific direction indicated by the third information from a plurality of candidate devices on a wireless network, and (2) a controlling module that controls a communication unit that is configured to communicate using the wireless network such that the communication unit communicates with the particular device selected by the selecting module.

16 Claims, 10 Drawing Sheets

FIG. 7

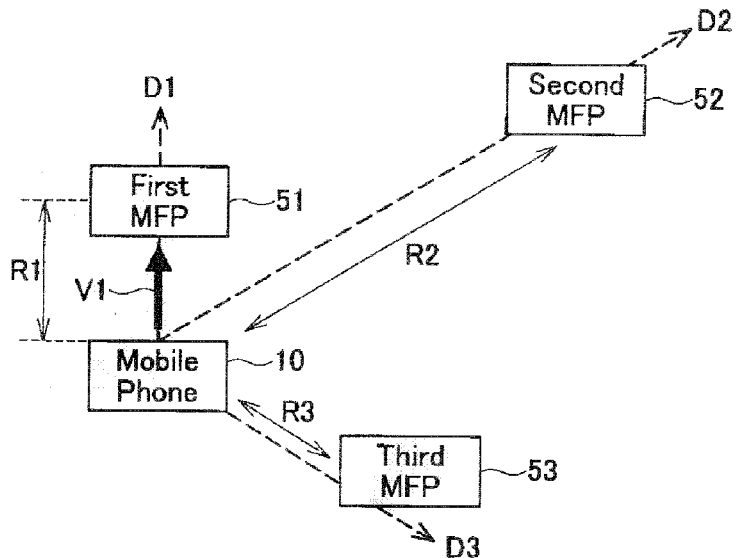

FIG. 8

| Selection Priority | MFP Name | IP Address | MFP Location Information | Relative Direction | Relative Distance | Flag |
|---|---|---|---|---|---|---|
| 1 | Third MFP | 192.168.0.3 | □□□ | D3 | R3 | — |
| 2 | Second MFP | 192.168.0.2 | △△△ | D2 | R2 | — |
| 3 | First MFP | 192.168.0.1 | ○○○ | D1 | R1 | — |

FIG. 9

| Selection Priority | MFP Name | IP Address | MFP Location Information | Relative Direction | Relative Distance | Flag |
|---|---|---|---|---|---|---|
| 1 | First MFP | 192.168.0.1 | ○○○ | D1 | R1 | Selection Candidate |
| 2 | Second MFP | 192.168.0.2 | △△△ | D2 | R2 | Selection Candidate |
| 3 | Third MFP | 192.168.0.3 | □□□ | D3 | R3 | — |

PROGRAM OF MOBILE DEVICE, MOBILE DEVICE, AND METHOD FOR CONTROLLING MOBILE DEVICE

CROSS-REFERENCE TO RELATED APPLICATIONS

This application claims priority to Japanese Patent Application No. 2010-218593, filed on Sep. 29, 2010 and Japanese Patent Application No. 2011-093374, filed on Apr. 19, 2011, the contents of which are hereby incorporated by reference into the present application.

TECHNICAL FIELD

The present application relates to a program of a mobile device, the mobile device, and a method for controlling the mobile device which enables a selection of an apparatus to engage in wireless communication by a simple procedure.

DESCRIPTION OF RELATED ART

A technique is known which connects a mobile device (a notebook personal computer, a mobile phone, or the like) and an apparatus (a printer or the like) by wireless communication (wireless LAN, Bluetooth, or the like). Radio waves in wireless communication have no directionality and are transmitted all around the mobile device. Therefore, a presence of a plurality of apparatuses around the mobile device means that there is a plurality of destination candidates of wireless communication. A technique is known which, in this case, displays a list of identification information (an address, a name, or the like) of apparatuses capable of wireless communication on a display unit of the mobile device to prompt a user to select a destination apparatus.

BRIEF SUMMARY

Conventionally, a technique is disclosed in which a mobile device and an image forming apparatus are provided with GPS (Global Positioning System) receivers and, based on coordinate data generated by GPS, the mobile device transmits print data to a nearest image forming apparatus. However, with the conventional technique, the mobile device may inadvertently transmit the print data to an image forming apparatus located behind a user. Therefore, the conventional technique had not necessarily been convenient for the user. The present specification provides a technique capable of eliminating such inconveniences.

In one aspect of the teachings disclosed herein, a computer-readable recording device may be provided. The computer-readable recording device may store a computer program including instructions for causing a computer of a mobile device to operate as: a selecting module that selects, based on first information, second information and third information, a particular device being substantially located in a specific direction indicated by the third information from a plurality of candidate devices on a wireless network, the first information indicating a physical location of the mobile device, the second information indicating physical locations of the plurality of candidate devices, the third information indicating the specific direction which had been specified by a predetermined operation received at an operation unit of the mobile device, and the specific direction being a direction with a location of the mobile device as reference, the operation unit being configured to receive operations on the mobile device by a user; and a controlling module that controls a communication unit that is configured to communicate using the wireless network such that the communication unit communicates with the particular device selected by the selecting module.

A method for controlling a mobile device and a mobile device are also novel and useful.

BRIEF DESCRIPTION OF DRAWINGS

FIG. 7 is a diagram showing an example of an arrangement of MFPs.
FIG. 8 is a first diagram showing an example of stored contents of a storage table.
FIG. 9 is a second diagram showing an example of stored contents of a storage table.

DETAILED DESCRIPTION

Figure 1:
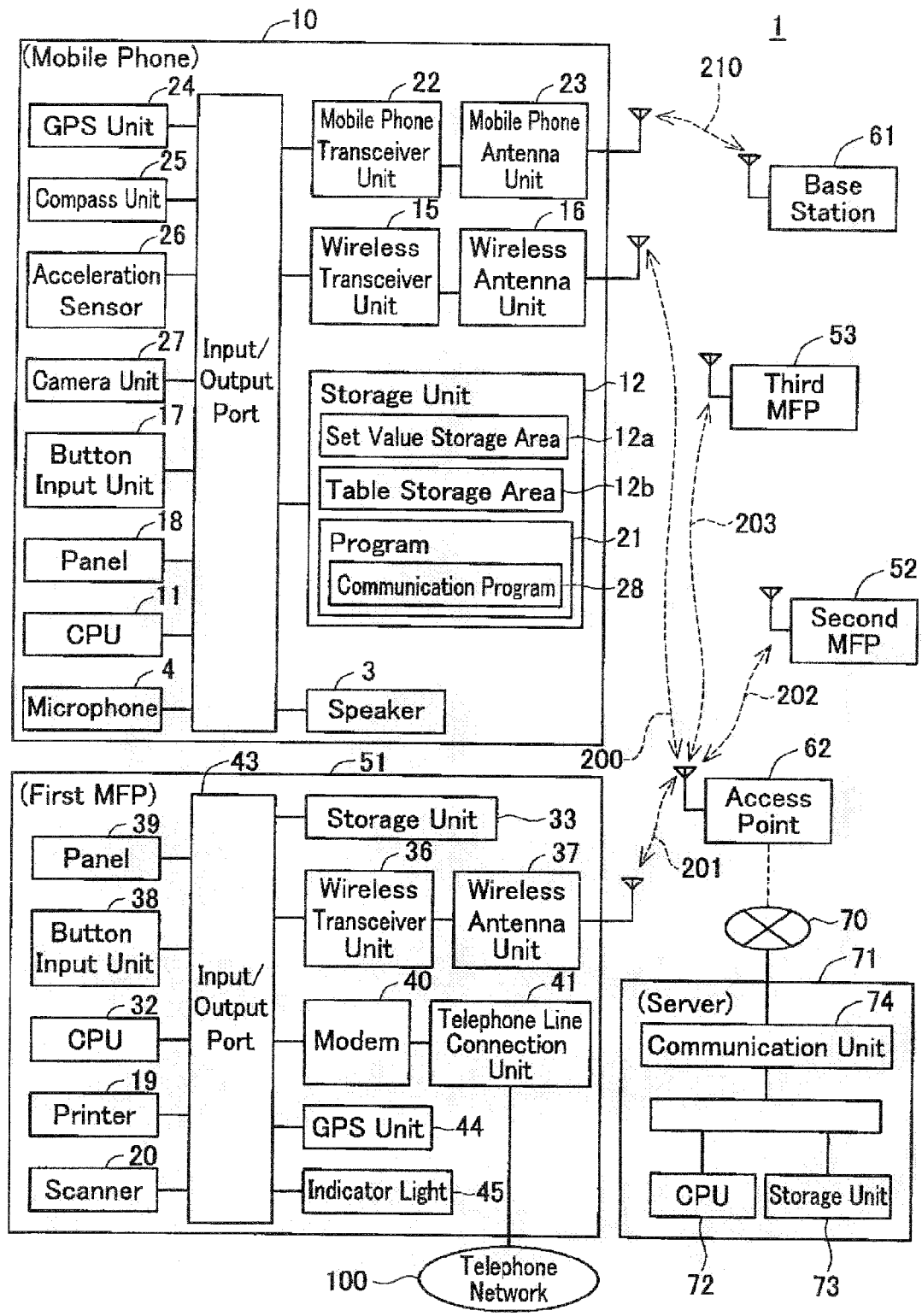
FIG. 1 is a block diagram of a communication system 1.

FIG. 1 shows a block diagram of a communication system 1 exemplified as a first embodiment of the present application. The communication system 1 comprises a mobile phone 10, first to third MFPs 51 to 53, an access point 62, a server 71, and a base station 61. The mobile phone 10 and the first to third MFPs 51 to 53 are each equipped with a function as a known wireless LAN terminal device. The first to third MFPs 51 to 53 are multifunction peripheral devices equipped with a printer function, a scanner function, a copier function, a facsimile function, and the like. The first to third MFPs 51 to 53 are equipped with a communication function which uses a telephone network 100. The access point 62 is equipped with a function as a known wireless LAN access point. The server 71 is connected to the access point 62 via the Internet 70.

Each of the first to third MFPs 51 to 53 and the access point 62 are configured to be capable of respectively performing wireless communications (data communications using radio waves) 201 to 203 conforming to a wireless LAN infrastructure mode (a mode in which a plurality of wireless LAN terminal devices performs data communication via an access point). Once the mobile phone 10 accesses the access point 62 and enters a state where wireless communication 200 conforming to a wireless LAN infrastructure mode can be performed, the mobile phone 10 can perform data communication with the first to third MFPs 51 to 53 and the server 71 via the access point 62. Examples of wireless LAN systems include a communication system specified by the IEEE802.11a/b/g/n standard.

A configuration of the mobile phone 10 will be described. As shown in FIG. 1, the mobile phone 10 mainly comprises a CPU (Central Processing Unit) 11, a storage unit 12, a wireless transceiver unit 15, a wireless antenna unit 16, a button input unit 17, a panel 18, a mobile phone transceiver unit 22, a mobile phone antenna unit 23, a GPS unit 24, a compass unit 25, an acceleration sensor 26, and a camera unit 27. A speaker 3 and a microphone 4 are provided for making calls and inputting sound.

Figure 6:
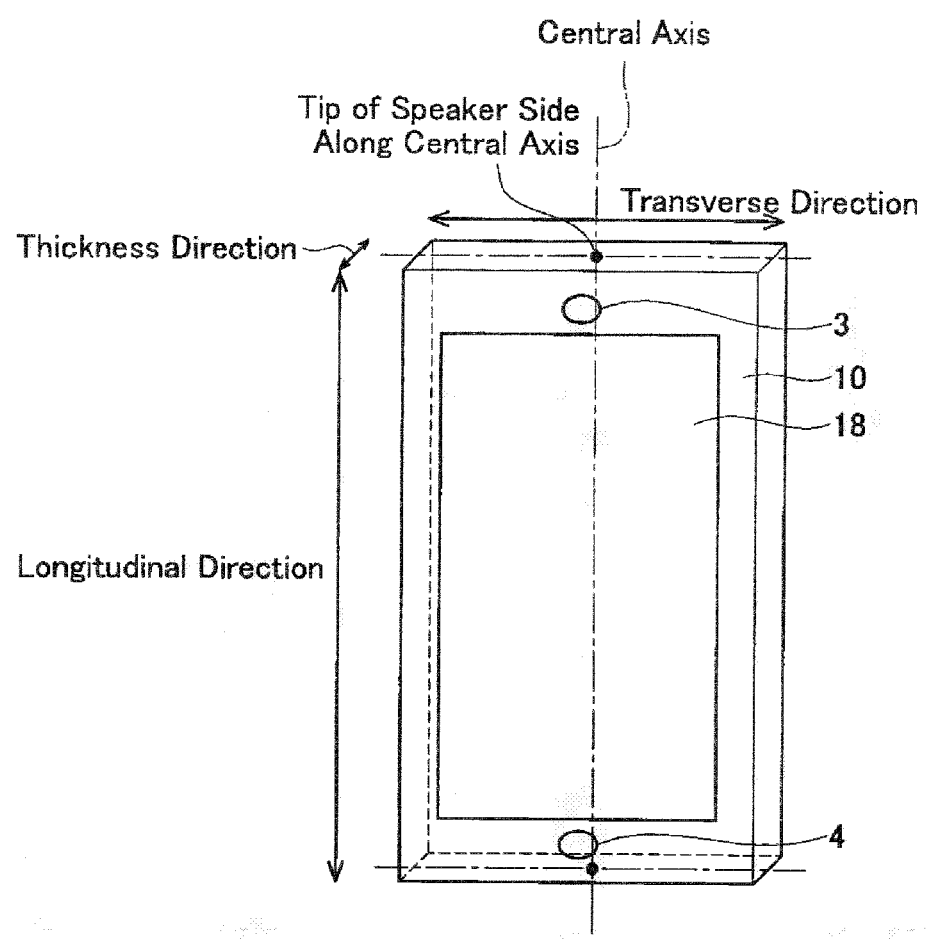
FIG. 6 is a schematic view of a mobile phone.

FIG. 6 shows a schematic view of the mobile phone 10. As shown in FIG. 6, an opening of the speaker 3 and an opening of the microphone 4 are arranged on an installation face of the panel 18 so that operations of the mobile phone 10 and calls using the mobile phone 10 may be easily performed. The opening of the speaker 3, the panel 18, and the opening of the microphone 4 are aligned in a longitudinal direction of the mobile phone 10 so that the opening of the speaker 3 and the opening of the microphone 4 are separated by a distance similar to a distance between the mouth and the ear of a user.

The CPU 11 executes processing according to programs stored in the storage unit 12. Subsequently, the CPU 11 that executes programs such as a communication program 28 or an operating system may sometimes be simply described by a program name. For example, the description "the communication program 28" may sometimes mean "the CPU 11 executing the communication program 28". The storage unit 12 is configured by combining a RAM (Random Access Memory), a ROM (Read Only Memory), a flash memory, an HDD (Hard Disk Drive), a buffer provided in the CPU 11, and the like. The wireless transceiver unit 15 performs wireless communication 200 conforming to a wireless LAN infrastructure mode via the wireless antenna unit 16. Digital signals constituting various data are transmitted and received by the wireless transceiver unit 15. The GPS unit 24 is a member which receives radio waves from a GPS satellite and which calculates location information indicating a physical location of the mobile phone 10. The term "physical location" herein may also be termed "absolute location". Location information includes latitude, longitude, and height components. The mobile phone transceiver unit 22 performs wireless communication 210 conforming to a mobile phone communication system with the base station 61 via the mobile phone antenna unit 23. The storage unit 12 stores a program 21. The program 21 includes a basic program (not shown), a communication program 28, and the like. The basic program includes a program for causing the mobile phone transceiver unit 22 to execute communication, a program for causing the wireless transceiver unit 15 to execute the wireless communication 200, and the like. The basic program is also a program which provides an API (Application Programming Interface) that enables respective programs to acquire information calculated by the GPS unit 24. The communication program 28 is a program which causes the CPU 11 to execute an operation flow of the communication system 1, which will be described later.

The storage unit 12 comprises a set value storage area 12a and a table storage area 12b. The set value storage area 12a stores a predetermined period, a predetermined acceleration value, an allowable angular range, a predetermined distance, and the like which will be described later. The table storage area 12b stores a storage table TB1. FIG. 8 shows an example of the storage table TB1. The storage table TB1 assigns a selection priority 220 to each of the first to third MFPs 51 to 53, and associatively stores MFP identification information 230, MFP location information 240, a relative direction 241, a relative distance 242, and a flag 243. The MFP identification information 230 is information that is unique to each of the first to third MFPs 51 to 53. The MFP identification information 230 is, for example, an IP address 232 of an MFP. An MFP name 231 is a name assigned to each of the first to third MFPs 51 to 53 by a user or administrator of the MFP or by a manufacturer prior to shipment. MFP location information 240 is information indicating a physical location of the first to third MFPs 51 to 53 and includes latitude, longitude, and height components. The mobile phone 10 receives information indicating a physical location from an MFP, and stores the information in the storage table TB1 without modification as the MFP location information 240 of the MFP. The relative direction 241 is information indicating directions in which the first to third MFPs 51 to 53 are located in relation to a location of the mobile phone 10 (directions with the mobile phone 10 as the reference). The relative direction 241 includes a horizontal component (a direction in which an MFP is located in relation to the mobile phone 10 when the mobile phone 10 and the location of the MFP relative to the mobile phone 10 are projected on a horizontal plane) and a vertical component (a direction in which the MFP is located in relation to the mobile phone 10 when the mobile phone 10 and the location of the MFP relative to the mobile phone 10 are projected on a vertical plane that is perpendicular to a vertical plane including the mobile phone 10 and the MFP). The relative distance 242 is a respective distance between the mobile phone 10 and the first to third MFPs 51 to 53. The relative distance 242 includes a horizontal component (a distance between the mobile phone 10 and an MFP when the mobile phone 10 and the location of the MFP relative to the mobile phone 10 are projected on a horizontal plane) and a vertical component (a distance between the mobile phone 10 and the MFP when the mobile phone 10 and the location of the MFP relative to the mobile phone 10 are projected on a vertical plane that is perpendicular to a vertical plane including the mobile phone 10 and the MFP). The flag 243 is flag information indicating a selection candidate.

The button input unit 17, the GPS unit 24, the compass unit 25, the acceleration sensor 26, and the camera unit 27 are operation units that receive an operation by a user of the mobile phone 10. The button input unit 17 is integrally configured with the panel 18 as a touch panel. The panel 18 displays various types of function information of the mobile phone 10. The compass unit 25 includes a geomagnetic sensor that acquires an orientation of the mobile phone 10. The acceleration sensor 26 is a sensor that measures an acceleration of the mobile phone 10. The camera unit 27 is a portion that acquires image data with a CCD or the like. The basic program provides an API (Application Programming Interface) that enables the respective programs to acquire information indicating an orientation acquired by the compass unit 25, an acceleration measured by the acceleration sensor 26, image data acquired by the camera unit 27, and the like.

A configuration of the first MFP 51 will be described. The first MFP 51 mainly comprises a CPU 32, a storage unit 33, a wireless transceiver unit 36, a wireless antenna unit 37, a button input unit 38, a panel 39, a modem 40, a telephone line connection unit 41, a printer 19, a scanner 20, a GPS unit 44, and an indicator light 45. These components are configured to be mutually communicable via an input/output port 43.

The CPU 32 controls respective functions according to programs stored in the storage unit 33, various signals transmitted and received via the wireless transceiver unit 36, and the like. The storage unit 33 may be configured by combining a RAM (Random Access Memory), a ROM (Read Only Memory), a flash memory, an HDD (Hard Disk Drive), or the like.

The wireless transceiver unit 36 performs wireless communication 201 conforming to a wireless LAN infrastructure mode via the wireless antenna unit 37. Digital signals constituting various data are transmitted and received by the wireless transceiver unit 36.

The button input unit 38 is one or more keys for executing various functions of the first MFP 51. The button input unit 38 may be integrally configured with the panel 39 as a touch panel. The panel 39 displays various function information of the first MFP 51. The printer 19 is a portion that executes printing. The scanner 20 is a portion that executes scanning. The GPS unit 44 is a portion that acquires location information of the first MFP 51. The indicator light 45 comprises an LED (Light Emitting Diode) or the like and is a portion that notifies various statuses of the first MFP 51 to the user. The modem 40 modulates document data to be transmitted using the facsimile function into a signal transmittable to the telephone network 100 and transmits the signal via the telephone line connection unit 41, and receives an inputted signal from the telephone network 100 via the telephone line connection unit 41 and demodulates the signal into document data. Since configurations of the second MFP 52 and the third MFP 53 are the same as the first MFP 51, a detailed description will be hereby omitted.

A configuration of the server 71 will be described. The server 71 mainly comprises a CPU 72, a storage unit 73, and a communication unit 74. The server 71 is a device that provides its own functions or data to a client device in a network. The CPU 72 controls various functions. The storage unit 73 stores various data. The communication unit 74 communicates various types of information with the mobile phone 10.

Figure 2:
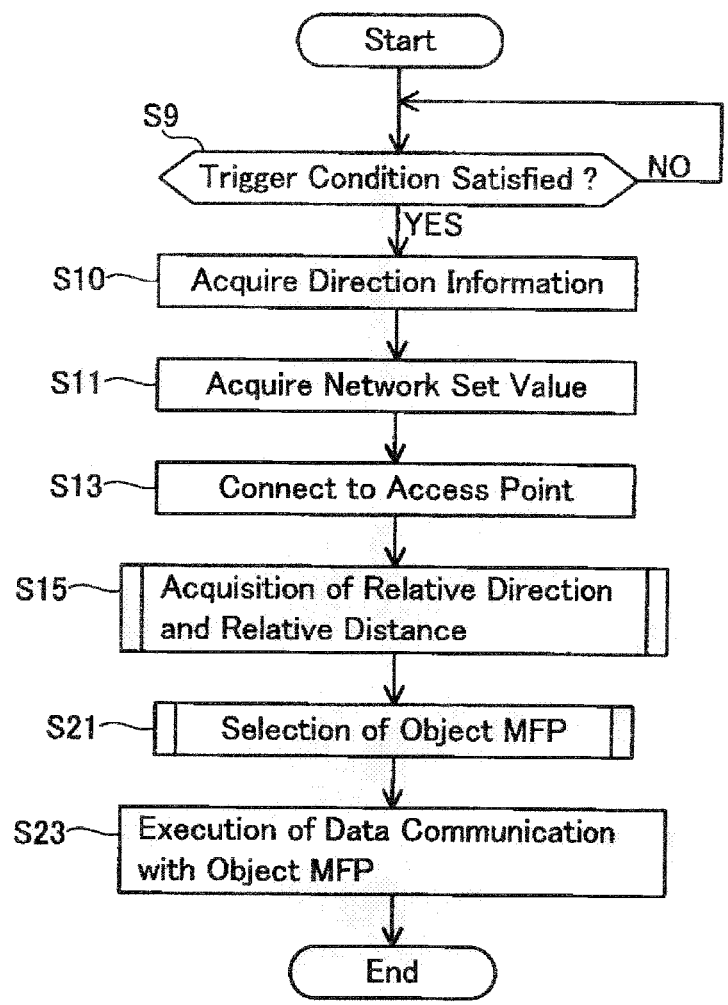
FIG. 2 is a diagram showing a first operation flow chart of a mobile phone.
Figure 3:
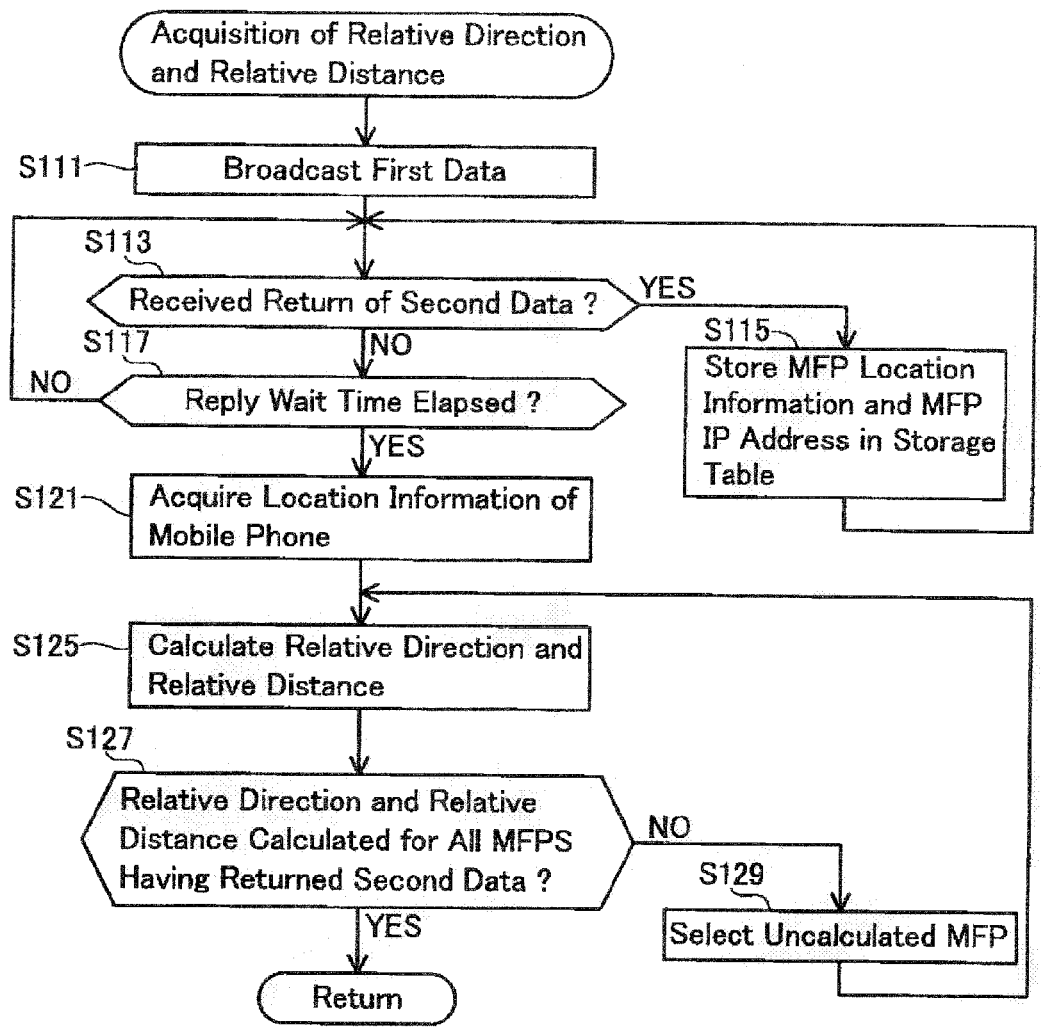
FIG. 3 is a diagram showing a second operation flow chart of a mobile phone.
Figure 4:
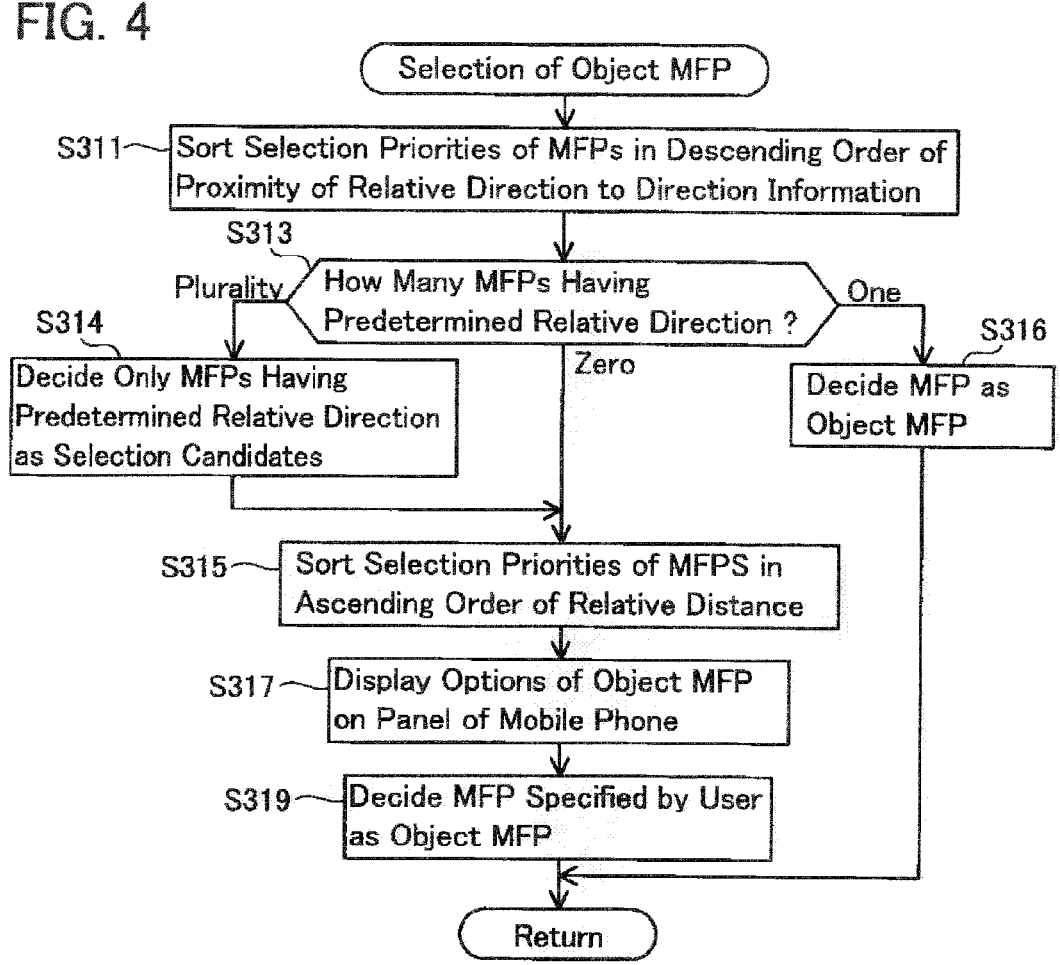
FIG. 4 is a diagram showing a third operation flow chart of a mobile phone.
Figure 14:
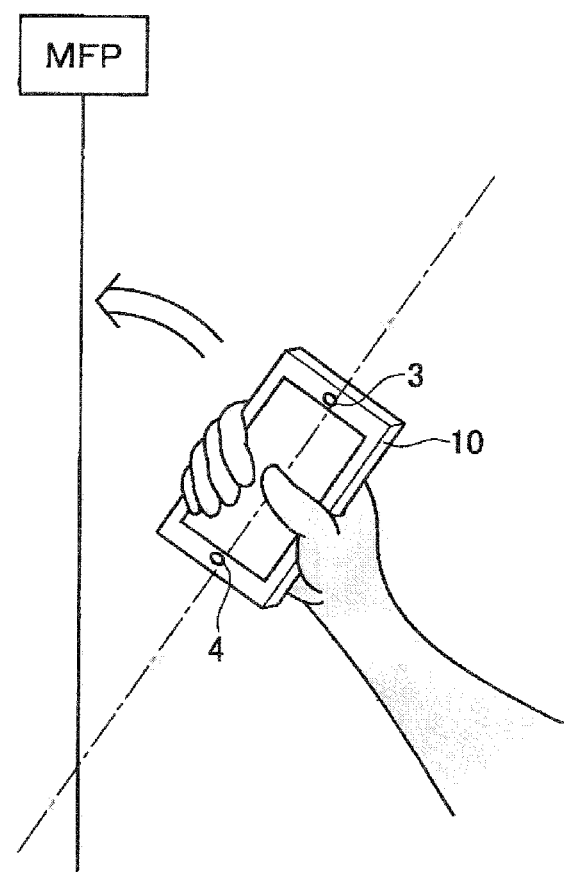
FIG. 14 is a schematic view of a usage example of a mobile phone.

Operations of the communication system 1 according to a first embodiment will be described with reference to FIGS. 2 to 9. A flow performed by the mobile phone 10 will be described with reference to FIGS. 2 to 4. The flows shown in FIGS. 2 to 4 are executed in response to an activation of the communication program 28 of the mobile phone 10. As shown in FIG. 14, in the first embodiment, the user grips a side of the microphone of the mobile phone 10 and holds the mobile phone so that the panel 18 faces upward, and when the user briskly waves the mobile phone 10 toward an MFP that the user wishes to set as a data communication object (so that a tip of a side of the speaker 3 of the mobile phone 10 points toward the MFP), the mobile phone 10 performs data communication with the MFP existing in a direction pointed by its speaker 3 side tip as the data communication object. The data communication object is an MFP to become an object of data communication (in other words, an MFP that is to execute the data communication with the mobile phone 10).

In S9 in FIG. 2, the CPU 11 first determines whether or not an acceleration measured by the acceleration sensor 26 has been abruptly switched from an acceleration, which is equal to or greater than a predetermined value and oriented in one direction, to an acceleration which has an equal or grater than predetermined value and is oriented in an opposite direction; in other words, whether or not an operation conducted by the user is an operation that satisfies a trigger condition. In particular, the CPU 11 makes a determination using acceleration acquired regularly using an API. When the trigger condition is not satisfied (S9: NO), the CPU 11 returns to S9. On the other hand, when the trigger condition is satisfied (S9: YES), the CPU 11 advances to S10. Providing the determination of the trigger condition means that processes of S10 and thereafter are not executed unless the user performs the operation in which the mobile phone 10 is briskly waved and then held still. Therefore, a situation can be prevented where data communication is executed by mistake due to the user moving the mobile phone 10 without an intention of performing data communication.

In S10, the CPU 11 uses the API to acquire information indicating an orientation of the mobile phone 10 from the compass unit 25. Using the acquired information, the CPU 11 calculates a direction in which the speaker 3 side tip is located in relation to the microphone side tip along a central axis in a longitudinal direction (an axis which is located at a center in a transverse direction and a center in a thickness direction and which extends in a longitudinal direction: refer to FIG. 6) of the mobile phone 10 in relation to a reference location of the mobile phone 10 (a center in the longitudinal direction, a center in the transverse direction, and a center in a thickness direction of the mobile phone 10: refer to FIG. 6). In other words, information is calculated which indicates what direction is specified by an operation received from the user by the mobile phone 10 in relation to the location of the mobile phone. The calculated information is stored in the storage unit 12 as a direction information. The direction information includes a horizontal component (a direction in which the tip of the mobile phone 10 on the speaker 3 side is located in relation to a reference location of the compass unit 25 when relative locations of the reference location of the compass unit 25 and a location of the speaker 3 side tip of the mobile phone 10 are projected on a horizontal plane).

Subsequently, in S11, the CPU 11 acquires a network set value. Specifically, a wireless LAN probe request is broadcasted using the wireless transceiver unit 15. An SSID (Service Set Identifier) included in a probe response returned by an access point (e.g., the access point 62) in a radio wave range of the wireless transceiver unit 15 is then received and temporarily stored in a work area (a RAM of the storage unit 12 or a buffer) of the CPU 11. In S13, the CPU 11 accesses the access point 62 using the acquired SSID and enters a state where wireless communication 200 conforming to the wireless LAN infrastructure mode can be performed.

In S15, the CPU 11 executes a flow for acquiring a relative direction and a relative distance. Detailed contents of the flow for acquiring the relative direction and the relative distance will be described with reference to FIG. 3. In S111, the CPU 11 uses the wireless transceiver unit 15 to broadcast first data (the first data includes a broadcast address as information indicating a destination of the first data in order to indicate that the first data is being broadcasted) by wireless communication 200 conforming to the wireless LAN infrastructure mode. As a result, wireless clients accessing the access point 62 (in other words, the wireless clients including the first to third MFPs 51 to 53) receive the first data via the access point. The first data includes identification information (IP address) of the mobile phone 10 in order to indicate a source of the first data. The first data also includes inquiry information (which is also information indicating that the data is first data; as a specific example, an SNMP (Simple Network Management Protocol) Request command) for inquiring whether the communication program 28 is supported.

In S113, the CPU 11 determines whether or not second data has been returned from the first to third MFPs 51 to 53. Specifically, the CPU 11 determines whether or not data has been received which includes the identification information of the mobile phone 10 in order to indicate the destination, the identification information (IP address) of an MFP in order to indicate the source, and reply information (which is also information indicating that the data is second data; as a specific example, an SNMP Reply command) for notifying the mobile phone that the data is a reply to the first data. When the second data is received (S113: YES), the CPU 11 advances to S115. In S115, the CPU 11 extracts MFP identification information from the second data. Since the second data also includes information indicating a physical location of an MFP, the CPU 11 also extracts information indicating a physical location of the MFP from the second data. The extracted identification information and information indicating the physical location are temporarily stored in the storage table TB1 as an IP address 232 and MFP location information 240 of the MFP.

When the second data has not been received (S113: NO), the CPU 11 advances to S117 to determine whether or not a reply wait time for the second data has elapsed. When the reply wait time has not elapsed (S117: NO), the CPU 11 returns to S113, and when it had elapsed (S117: YES), the CPU 11 advances to S121. In S121, the CPU 11 acquires location information of the mobile phone 10 calculated by the GPS unit 24. The acquired location information of the mobile phone 10 is temporarily stored in the storage unit 12.

In S125, the CPU 11 calculates a relative direction and a relative distance. The calculation of the relative direction and the relative distance is performed based on the location information of the mobile phone 10 and the MFP location information 240 stored in the storage unit 12. The calculated relative direction and relative distance are temporarily stored in the storage table TB1 as the relative direction 241 and the relative distance 242 of the MFP.

In S127, the CPU 11 determines whether or not the relative direction 241 and the relative distance 242 have been calculated for all MFPs which have returned the second data. If calculated (S127: YES), the CPU 11 ends the flow, and the CPU 11 advances to S21 (FIG. 2), and if not calculated (S127: NO), the CPU 11 advances to S129. In S129, the CPU 11 selects an uncalculated MFP and then returns to S125. Accordingly, the relative direction 241 and the relative distance 242 can be acquired for all MFPs which have returned the second data.

In S21, the CPU 11 selects an object MFP based on the direction information, the location information of the mobile phone 10, and the location information of MFP respectively stored in the storage unit 12. An object MFP is an MFP to become an object of data communication (in other words, an MFP that is to execute the data communication with the mobile phone 10). A flow for selecting the object MFP will be described with reference to FIG. 4. In S311, the CPU 11 sorts the selection priorities 220 of MFPs stored in the storage table TB1 so that the selection priority 220 of an MFP with a small difference between the direction indicated by the horizontal component of the relative direction 241 and the direction indicated by the horizontal component of the direction information is given a higher priority than the selection priority 220 of an MFP with a large difference between the direction indicated by the horizontal component of the relative direction 241 and the direction indicated by the horizontal component of the direction information.

In S313, the CPU 11 determines the number of MFPs (MFPs existing in front of the user of the mobile phone 10) of which a difference between a direction indicated by a horizontal component of the relative direction 241 and a direction indicated by a horizontal component of the direction information is less than 90 degrees (in other words, in a direction pointed by the speaker 3 side tip of the mobile phone 10 or in front as seen from the user of the mobile phone 10). When there is a plurality of MFPs existing in front of the user (S313: plurality), the CPU 11 advances to S314. When no MFP exists in front of the user (S313: zero), the CPU 11 advances to S315. When there is only one MFP existing in front of the user (S313: one), the CPU 11 advances to S316. In S316, the CPU 11 decides the MFP to be the object MFP and finishes the flow. In S314, the CPU 11 sets the MFPs existing in front of the user as selection candidates. For example, when the user of the mobile phone 10 is on a first floor, it is inconvenient to set an MFP installed on a second floor as the data communication object. Therefore, only MFPs of which the distance indicated by the vertical component of the relative distance 242 is within a threshold value (for example, less than 2 meters) are set as the selection candidates among the MFPs of which the difference between the direction indicated by the horizontal component of the relative direction 241 and the direction indicated by the horizontal component of the direction information is less than 90 degrees. Setting as the selection candidate means to store information of the MFP, that is set as the selection candidate, in the storage table TB1 in association with the flag 243 (FIG. 8) indicating that the MFP is the selection candidate. In S315, the CPU 11 sorts selection priorities 220 of MFPs stored in the storage table TB1 so that the selection priority 220 of the MFP with a shorter distance indicated by the horizontal component of the relative distance 242 is given a higher priority than the selection priority 220 of the MFP with a longer distance indicated by the horizontal component of the relative distance 242.

In S317, the CPU 11 causes the panel 18 of the mobile phone 10 to display, based on the storage table TB1, options (buttons presenting MFP names) indicating MFPs that are the selection candidates (MFPs having information stored in the storage table TB1 in association with the flag 243).

In S319, when any one of the options is specified by a user input to the operation unit, the CPU 11 decides the MFP indicated by the specified option to be the object MFP. Once the object MFP is decided, the CPU 11 finishes the flow shown in FIG. 4 and returns to S23 (FIG. 2).

In S23, the CPU 11 executes data communication with the object MFP. Specifically, the CPU 11 executes data communication in which the CPU 11 reads out MFP identification information 230 (IP address) of the object MFP from the storage table TB1, causes the wireless transceiver unit 15 to transmit data including the IP address of the object MFP to be indicated as the destination as transmission data to the object MFP, and causes the wireless transceiver unit 15 to receive data including the IP address of the object MFP (in other words, data transmitted by the object MFP) as reception data. The IP address of the object MFP is information for identifying a sender of the data. Various types of data are conceivable as the data handled in data communication. For example, processing data may be transmitted to the object MFP by the wireless transceiver unit 15 to have the object MFP execute predetermined processing thereon. Specifically, print data may be transmitted to the object MFP by the wireless transceiver unit 15 to have the object MFP perform printing of the print data using the printer 19. A scanning instruction may be transmitted to the object MFP by the wireless transceiver unit 15 to have the wireless transceiver unit 15 receive scan data generated by the object MFP using the scanner 20 from the object MFP. An IP phone instruction may be transmitted to the object MFP by the wireless transceiver unit 15 to have the object MFP execute a call or a facsimile communication to a phone device or a facsimile device existing on another end of the telephone line via the modem 40 of the object MFP and the telephone line connection unit 41.

Figure 5:
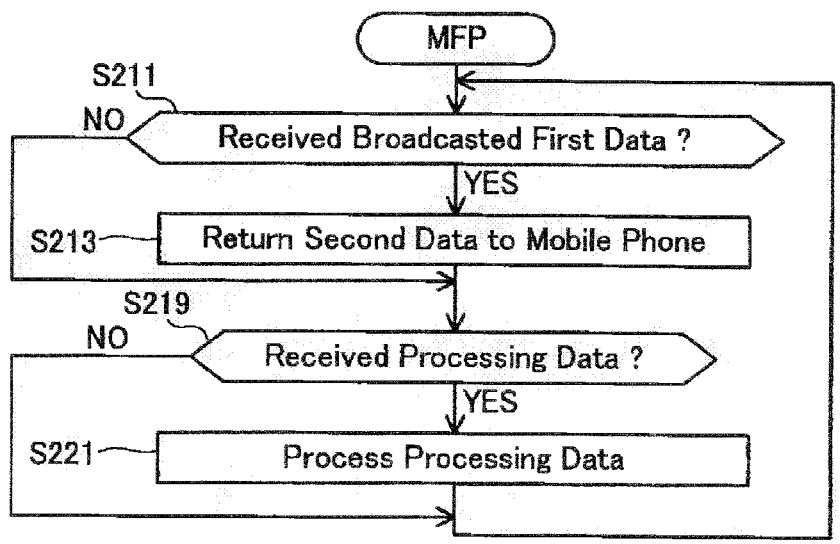
FIG. 5 is a diagram showing an operation flow chart of an MFP.

Flows performed at the first to third MFPs 51 to 53 will be described with reference to FIG. 5. In S211, the CPU 32 determines whether or not first data broadcasted from the mobile phone 10 has been received (specifically, the CPU 32 determines whether or not data has been received which includes a broadcast address as information indicating a destination and which includes information indicating that the data is first data). When not received (S211: NO), the CPU 32 advances to S219, and when received (S211: YES), the CPU 32 advances to S213. In S213, the CPU 32 returns the second data to the mobile phone 10.

In S219, the CPU 32 determines whether or not processing data such as print data has been received from the mobile phone 10. When not received (S219: NO), the CPU 32 returns to S211, and when received (S219: YES), the CPU 32 advances to S221. In S221, the CPU 32 executes processing on the processing data. For example, when the processing data is print data, processing is executed for printing the print data using the printer 19. The CPU 32 then returns to S211.

As a specific example of operations of the communication system 1 according to the first embodiment, a case will be described in which first to third MFPs 51 to 53 are arranged in a form shown in FIG. 7. A case will be described in which the first MFP 51 is selected as an object MFP. A case will be described in which the acceleration sensor 26 is used as an operation unit which receives an operation by the user. A case will be described in which print data is transmitted to the object MFP.

The flow shown in FIG. 2 is started in response to an activation of the communication program 28 by an operation of the button input unit 17 of the mobile phone 10 by the user. A trigger condition is satisfied in correspondence to the mobile phone 10 being briskly waved toward the first MFP 51 and then held still by the user who wishes to set the first MFP 51 as the data communication object (S9: YES). Subsequently, the mobile phone 10 acquires direction information (S10). In this case, the direction indicated by the direction information is a direction from the mobile phone 10 toward the first MFP 51. The mobile phone 10 then accesses the access point 62 and enters a state where wireless communication 200 conforming to the wireless LAN infrastructure mode can be performed (S13). Next, the mobile phone 10 broadcasts first data to the first to third MFPs 51 to 53 (S111). Subsequently, the first to third MFPs 51 to 53 receive the first data (S211: YES) and return second data to the mobile phone 10 (S213). The mobile phone 10 receives the second data from the first to third MFPs 51 to 53 (S113: YES) and stores the second data in the storage table TB1 of the storage unit 12 (S115). Therefore, as shown in FIG. 8, the MFP identification information 230 and the MFP location information 240 are associated to each of the first to third MFPs 51 to 53 and stored in the storage table TB1. At this point, the selection priorities 220 are arranged in a sequence of storage of the selection priorities 220 in the storage table TB1.

The mobile phone 10 acquires location information of the mobile phone calculated by the GPS unit 24 (S121). The mobile phone 10 calculates the relative direction and the relative distance for each of the first to third MFPs 51 to 53 (S125). As a result, as shown in FIG. 7, a relative direction D1 of the first MFP 51, a relative direction D2 of the second MFP 52, and a relative direction D3 of the third MFP 53 are calculated. A relative distance R1 of the first MFP 51, a relative distance R2 of the second MFP 52, and a relative distance R3 of the third MFP 53 are respectively calculated. Subsequently, as shown in FIG. 8, the calculated relative directions and relative distances are stored in the storage table TB1 as the relative direction 241 and the relative distance 242.

Once the relative direction and the relative distance have been calculated for all of the first to third MFPs 51 to 53 (S127: YES), the mobile phone 10 sorts the selection priorities 220 of the MFPs stored in the storage table TB1 in an ascending order of the difference between the direction indicated by the horizontal component of the relative direction 241 and the direction indicated by the horizontal component of direction information V1 (S311). In the example shown in FIG. 7, since the direction indicated by the horizontal component of the direction information V1 and the direction indicated by the horizontal component of the relative direction 241 (=D1) are consistent with each other, the selection priority 220 of the first MFP 51 is set to "1" which is the highest priority. Since the direction indicated by the horizontal component of the direction information V1 and the direction indicated by the horizontal component of the relative direction 241 (=D3) significantly differ from each other, the selection priority 220 of the third MFP 53 is set to "3" which is the lowest priority. Since there is a plurality of MFPs (the first MFP 51 and the second MFP 52) whose difference between the direction indicated by the horizontal component of the direction information V1 and the direction indicated by the horizontal component of the relative direction 241 are less than 90 degrees (S313: YES), only the first MFP 51 and the second MFP 52 are set as the selection candidates (S314), and the flag 243 indicating that the MFP is a selection candidate is stored in the storage table TB1 (FIG. 9). Subsequently, the selection priorities 220 are sorted in an ascending order of a distance indicated by a horizontal component of the relative distance 242 (S315). In the example shown in FIG. 7, since a distance indicated by a horizontal component of the relative distance 242 (=R1) is shorter than a distance indicated by a horizontal component of the relative distance 242 (=R2), the selection priority 220 of the first MFP 51 is set to "1" and the selection priority 220 of the second MFP 52 is set to "2". Accordingly, sorting is completed as shown in the storage table TB1 of FIG. 9.

Subsequently, the mobile phone 10 causes the panel 18 to display options indicating the MFPs that are the selection candidates (S317). In the example shown in FIG. 7, an option indicating the first MFP 51 and an option indicating the second MFP 52 are displayed on the panel 18. When the user operates the button input unit and performs a user input that selects the option indicating the first MFP 51, the mobile phone 10 decides to set the first MFP 51 as the object MFP (S319). The mobile phone 10 executes data communication with the first MFP 51 and transmits print data (S23). The first MFP 51 receives the print data (S219: YES) and prints the print data using the printer 19 (S221). The flow is then finished.

Advantageous effects of the communication system 1 according to the example of the first embodiment described above will now be described. With the communication system 1, as the user activates the communication program 28 and briskly waves and then holds still the mobile phone 10 in a direction of an MFP which the user desires as the object of data communication by the mobile phone 10, the mobile phone 10 decides to set the MFP existing in that direction as the object MFP and does not set an MFP existing in a direction opposite to the direction in which the mobile phone 10 had been waved and held still as the object MFP. In other words, since a situation where the user inadvertently communicates with the MFP existing in an undesired direction is eliminated, greater convenience is achieved for the user.

With the communication system 1, when deciding on the object MFP, in a case where a plurality of MFPs exists in the direction in which the user waves and then holds still the mobile phone 10, options indicating the MFPs are displayed on the panel 18 to have the user select an option. In other words, even when a single object MFP cannot be decided by using only the relative direction 241, the single appropriate object MFP can be decided.

In the communication system 1, processing of S10 and thereafter is executed when the trigger condition is satisfied. Therefore, a situation can be prevented where the object MFP is erroneously selected when the user does not intend to select the object MFP.

In the communication system 1, location information of the mobile phone 10 is acquired when it is determined that the trigger condition has been satisfied. Accordingly, the object MFP can be identified based on the location information of the mobile phone 10 at a point where the trigger condition is satisfied. Therefore, even in a case where a network status varies dynamically such as when the user operates the mobile phone 10 while moving, the object MFP can be reliably identified. With the communication system 1, an occurrence of an acceleration measured by the acceleration sensor 26 exceeding a threshold value is set as the trigger and direction information is calculated using the compass unit 25. Therefore, processing for selecting an object MFP can be executed in response to various actions of the user including the user waving the mobile phone 10 vertically and then holding the mobile phone 10 still, the user waving the mobile phone 10 horizontally and then holding the mobile phone 10 still, or the user holding the mobile phone 10 still in a posture in which the speaker 3 side tip of the mobile phone 10 is pointed outward.

While the first embodiment has been described in detail above, such description is for illustrative purposes only and is not intended to limit the scope and claims of the invention. Techniques described in the claims of the invention include various modifications and changes made to the specific example illustrated above.

For example, a configuration in which, in S10, the CPU 11 calculates information indicating a direction in which the speaker 3 side tip of the mobile phone 10 is located in relation to a reference location of the mobile phone 10 is not restrictive. As a first modification, in S10, the CPU 11 may calculate information indicating a direction in which the microphone side tip of the mobile phone 10 is located in relation to a reference location of the mobile phone 10. With such a modification, similar convenience to the first embodiment can be achieved in the user gripping the speaker 3 side of the mobile phone 10, waving the mobile phone 10 so that the microphone side tip points in the direction in which the MFP that the user desires as the data communication object exists, and then holding the mobile phone 10 still.

As a second modification, in S10, the CPU 11 may calculate information indicating a direction in which the installation face of the camera unit 27 on the mobile phone 10 is located in relation to a reference location of the mobile phone 10. With such a modification, similar convenience to the first embodiment can be achieved in the user gripping the mobile phone 10 so that the camera unit 27 points in the direction in which the MFP that the user desires as the data communication object exists, and then holding out the mobile phone 10 to stop the waving motion.

For example, the operation that satisfies the trigger condition is not limited to waving the mobile phone 10 and then holding the mobile phone 10 still. As a third modification, a configuration may be adopted in which the button input unit 17 is used as the operation unit and an operation for instructing photography using the camera unit 27 to be performed is used as the operation that satisfies the trigger condition. In this case, when the user activates the communication program 28, the camera unit 27 is activated and the panel 18 functions as an electronic viewfinder of the camera unit 27. Subsequently, in S9 in the flow shown in FIG. 2, the CPU 11 determines whether or not a user operation on the button input unit 17 with an intention to perform photography using the camera unit 27 (in other words, an operation satisfying the trigger condition) has been made. When the trigger condition is satisfied (S9: YES), in S10, the CPU 11 uses the compass unit 25 to calculate a direction in which the installation face of the camera unit 27 on the mobile phone 10 is located in relation to a reference location of the mobile phone 10 or, in other words, information indicating a direction in which the user viewing the panel 18 that is an electronic viewfinder had pointed the camera unit 27 during photography, and stores the same in the storage unit 12 as direction information.

A configuration may be adopted in which, in S9 and S10 in the third modification, the CPU 11 executes the same processing as in the second modification. With such a configuration, similar convenience to the first embodiment can be achieved by usage in which a user activates the communication program 28, and performs photography with the camera unit 27 pointed (or holding out the mobile phone 10) in the direction in which the MFP that the user desires as the object of data communication with the mobile phone 10.

As a fourth modification, a configuration may be adopted in which the acceleration sensor 26 is used as an operation unit and the mobile phone 10 kept oriented by the user in a same direction for a predetermined period of time is used as an operation that satisfies the trigger condition. In this case, when the user activates the communication program 28, in S9 in the flow of the mobile phone 10 shown in FIG. 2, the CPU 11 determines whether or not a predetermined period of time has elapsed without an acceleration measured by the acceleration sensor 26 exceeding a threshold value that is a value small enough that an intentional movement of the mobile phone 10 is inconceivable (in other words, whether or not an operation that satisfies a trigger condition has been performed). When the trigger condition has been satisfied (S9: YES), in S10, the CPU 11 executes the same processing as any of the first embodiment, the first modification, the second modification, and the third modification. In the same manner as in the third modification, when the user activates the communication program 28, the camera unit 27 may be activated and the panel 18 may function as the electronic viewfinder of the camera unit 27. With such a modification, similar convenience to the first embodiment can be achieved in the user activating the communication program 28, and holding the speaker 3 side tip of the mobile phone 10 (or the microphone side tip or the installation face of the camera unit 27) still for a predetermined period of time in the direction in which the MFP that the user desires as the object of data communication with the mobile phone 10 exists.

In the fourth modification, a configuration may be adopted in which, in S9, the CPU 11 determines whether or not a predetermined period of time has elapsed without a variation equal to or greater than a threshold value in the location information calculated by the GPS unit 24. A configuration may be adopted in which, in S9, a determination is made as to whether or not a predetermined period of time has elapsed without a variation equal to or greater than a threshold value in the information indicating an orientation acquired by the compass unit 25. Even with these configurations, similar convenience to the first embodiment can be achieved.

As a fifth modification, a configuration may be adopted in which the button input unit 17 (or a touch panel) or the microphone 4 is used as an operation unit and a predetermined input performed by the user to the button input unit 17 or the microphone 4 is used as an operation that satisfies the trigger condition. In this case, when the user activates the communication program 28, in S9 in the flow of the mobile phone 10 shown in FIG. 2, the CPU 11 determines whether or not a predetermined input has been made to the button input unit 17 (in other words, whether or not an operation satisfying the trigger condition has been performed). When the trigger condition has been satisfied (S9: YES), in S10, the CPU 11 executes the same processing as any of the first embodiment, the first modification, the second modification, and the third modification. In the same manner as in the third modification, when the user activates the communication program 28, the camera unit 27 may be activated and the panel 18 may function as an electronic viewfinder of the camera unit 27. With such a modification, similar convenience to the first embodiment can be achieved by usage in which a user activates the communication program 28, points the speaker 3 side tip (or the microphone side tip or the installation face of the camera unit 27) of the mobile phone 10 in a direction in which an MFP that the user desires as an object of data communication with the mobile phone 10 exists, and performs a predetermined input to the button input unit 17 or the microphone 4.

In the fifth modification, the predetermined input may be an input in which a directional button (not shown; for example, a front button may be associated with an angle of 0 degrees, a right button with an angle of 90 degrees rightward, a left button with an angle of 90 degrees leftward, and a rear button with an angle of 180 degrees) of the button input unit 17 (including a touch panel) is operated. Also in the fifth modification, the predetermined input may be an input to the button input unit 17 (touch panel) in which an indicator (a finger, a stylus pen, or the like) is slid in a predetermined direction (for example, a sliding motion in the longitudinal direction toward the speaker 3 side tip may be associated with an angle of 0 degrees, a rightward sliding motion in a transverse direction with an angle of 90 degrees rightward, a leftward sliding motion in a transverse direction with an angle of 90 degrees leftward, and a sliding motion in the longitudinal direction toward the microphone side tip may be associated with an angle of 180 degrees). Also in the fifth modification, the predetermined input may be a voice input indicating a direction to the microphone 4 (for example, an utterance of "front" may be associated with an angle of 0 degrees, an utterance of "right" with an angle of 90 degrees rightward, an utterance of "left" with an angle of 90 degrees leftward, and an utterance of "rear" with an angle of 180 degrees). Subsequently, after such input is performed, in S10, information indicating a direction obtained by adding an angle associated with the directional button operated by the user to information calculated by the CPU 11 may be stored in the storage unit 12 as direction information.

By adopting such a configuration, similar convenience to the first embodiment (with respect to a direction in which any of the speaker 3 side tip, the microphone side tip, and the camera unit 27 is pointed, an MFP existing to the right (for example) is decided as an object MFP and an MFP existing to the left is not decided as an object MFP) can be achieved by usage in which a user activates the communication program 28, points the speaker 3 side tip (or the microphone side tip or the installation face of the camera unit 27) of the mobile phone 10 in a direction in which an MFP that the user desires as an object of data communication with the mobile phone 10, and operates a directional button, slides a finger, or inputs an utterance into the microphone 4.

As a sixth modification, in S10, information indicating an orientation of the mobile phone 10 may be acquired using the acceleration sensor 26. Specifically, when one direction measured by the acceleration sensor 26 in S9 and an opposite direction of the one direction are on a same axis, a direction of the axis may be stored in the storage unit 12 as information indicating the orientation of the mobile phone 10.

As a seventh modification, a modification will be described in which, in S313 (FIG. 4), a plurality of MFPs does not exist in front of the user (S313: zero). In this case, in S317, an absence of selection candidate MFPs may be displayed on the panel 18 of the mobile phone 10 to end the flow. Alternatively, in this case, in S317, the absence of the selection candidate MFPs in the direction in which the user had waved the mobile phone 10 may be displayed on the panel 18 of the mobile phone 10. MFPs (first to third MFPs 51 to 53) connected to a wireless network formed by the access point 62 may be displayed as options on the panel 18. Subsequently, in S319, a selection input of an option may be received.

As an eighth modification, in S9 (FIG. 2), a determination that an operation by the user satisfies a trigger condition may be made subject to a detection of an acceleration measured by the acceleration sensor 26 equaling or exceeding a predetermined value. Accordingly, the trigger condition can be detected simply by a large acceleration being applied to the mobile phone 10. Therefore, an object MFP can be decided by having the user simply perform an operation of briskly waving the mobile phone 10 toward an MFP which the user wishes to set as an object of data communication. As a result, a need for performing an operation of holding the mobile phone 10 still after waving the mobile phone 10 can be eliminated.

For example, a configuration may be adopted in which, in S11, a plurality of network set values is acquired (for example, by receiving a probe response from a plurality of access points), and the plurality of access points is accessed using the set values. In this case, the CPU 11 acquires a plurality of network set values in S11. Subsequently, processing is repeated which includes, in S13, accessing an access point using one of the acquired set values, and in S15, executing a flow for acquiring a relative direction and a relative distance, whereby every time a relative direction and a relative distance are acquired, the relative direction and the relative distance are additionally stored in the storage table TB1. Such a configuration enables an object MFP to be selected not only from MFPs connected to one network but also from MFPs connected to other networks. A configuration may be adopted in which, for example, an acquisition of a network set value in S11 involves temporarily storing a network set value stored in advance in the set value storage area 12a of the mobile phone 10 in a work area of the CPU 11.

In a case where, despite a determination is made in S9 in that an operation satisfying the trigger condition has been performed (S9: YES), the mobile phone 10 does not perform data communication with an object MFP in S23 and a connection between a network accessed by the mobile phone 10 and the mobile phone 10 is cut off, it is unnecessary to discard a value of the storage table TB1 stored in S15 and once again determine in S9 that an operation satisfying the trigger condition has been performed, and processing may be restarted from S10. Accordingly, even in a situation where network connection is susceptible to interruptions such as when the user operates the mobile phone 10 while moving so as to approach an MFP which the user desires as an object of data communication with the mobile phone 10, since the acquisition of the direction information and the acquisition of the relative direction and the relative distance are performed without the user having to once again perform the operation for satisfying the trigger condition, data communication can be performed between an MFP existing in the direction desired by the user and the mobile phone 10.

A determination that an operation satisfying the trigger condition has been performed need not be made once again in S9 after discarding a value of the storage table TB1 stored in S15, and processing may be restarted from S11. Accordingly, even in a situation where network connection is susceptible to interruptions such as when the user first performs the operation indicating the direction of an MFP which the user desires as the object of data communication with the mobile phone 10 and then holds the mobile phone 10 in a manner that is arbitrary to the user and approaches the desired MFP, the acquisition of the relative direction and the relative distance are performed without the user having to once again perform the operation for satisfying the trigger condition. Therefore, data communication can be performed between an MFP existing in the direction desired by the user and the mobile phone 10.

For example, processing of S11 to S13 may be regularly executed in response to power activation of the mobile phone 10, and when the trigger condition is satisfied (S9: YES), processing of S10 and then S15 may be executed. For example, processing of S11 to S15 may be regularly executed in response to power activation of the mobile phone 10, and when the trigger condition is satisfied (S9: YES), processing of S10 and then S21 may be executed.

For example, with respect to the MFP decided as the object MFP in S21, the wireless transceiver unit 15 may be configured to execute processing for transmitting a notification which notifies that the MFP has been decided as the object MFP. Subsequently, when a reply signal such as an ACK signal is not received within a predetermined period of time, the wireless transceiver unit 15 may be configured to execute processing for deciding another MFP as the object MFP and retransmitting the notification to the newly decided object MFP. Accordingly, communication with the object MFP can be performed more reliably.

For example, a configuration may be adopted in which the server 71 regularly receives identification information and information indicating the physical location from the first and second MFPs 51 and 52 respectively and stores the information in the storage unit 73. In this case, upon receiving first data transmitted by the mobile phone 10 in S111, the server 71 returns second data including the stored identification information and information indicating a physical location of the first and second MFPs 51 and 52 to the mobile phone 10. The second data returned by the server 71 includes identification information of the mobile phone 10 for indicating the destination, identification information (IP address) of the server 71 for indicating the source, and return information which indicates that the data is second data. In this case, upon receiving, in S113, the second data transmitted by the server 71, the CPU 11 of the mobile phone 10 extracts MFP identification information and information indicating the physical location from the second data in S115 and temporarily stores the information in the storage table TB1.

In the first embodiment, the mobile phone 10 communicates with the first to third MFPs 51 to 53 via the access point 62 by wireless communication 200 conforming to the wireless LAN infrastructure mode. Alternatively, a configuration may be adopted in which the mobile phone 10 directly communicates with the first to third MFPs 51 to 53 by wireless communication 200 conforming to Bluetooth (registered trademark). In this case, the first to third MFPs 51 to 53 are in states capable of responding to the search while conforming to Bluetooth. In S11, the CPU 11 of the mobile phone 10 receives a response including an MFP Bluetooth address (a type of identification information which is also referred to as an BD address) from the MFPs existing at a distance in which wireless communication conforming to Bluetooth can be performed with the mobile phone 10 (in other words, first to third MFPs 51 to 53). Specifically, for example, a search according to SDAP (Service Discovery Application Profile) is performed and a response is received from a device that provides a printer function and a scanner function (in other words, an MFP). Then, in S13, a connection is made to the first MFP 51 according to connection processing conforming to Bluetooth. Subsequently, in S15, a relative direction and a relative distance are acquired from the connected MFP. In this case, in S111, instead of broadcasting the first data, the wireless transceiver unit 15 may be configured to execute processing for transmitting first data including a Bluetooth address of the connected MFP in order to indicate a destination. Subsequently, a return is made to S13 to make a connection to the second MFP 52, S15 is executed, a return is made to S13 to make a connection to the third MFP 53, and S15 is executed (in other words, processing of S13 and S15 is executed for all MFPs existing in a distance over which wireless communication can be performed). Thereafter, the object MFP is identified in S21 and data communication is executed with the object MFP in S23. In a configuration in which communication is directly performed with the first to third MFPs 51 to 53, wireless communication which conforms to a wireless LAN ad-hoc mode (a mode in which a plurality of wireless LAN terminal devices perform direct data communication without access points) can be used instead of Bluetooth.

Figure 10:
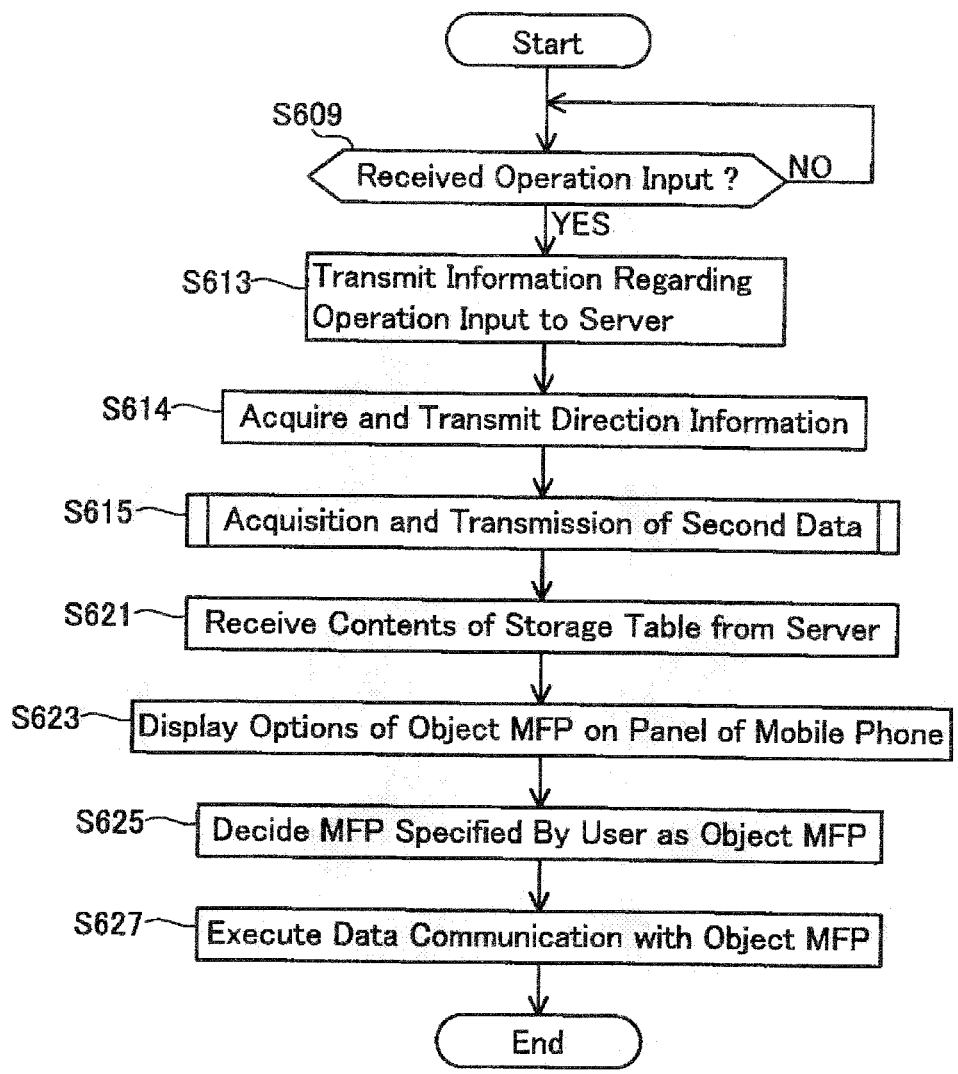
FIG. 10 is a diagram showing a fourth operation flow chart of a mobile phone.
Figure 11:
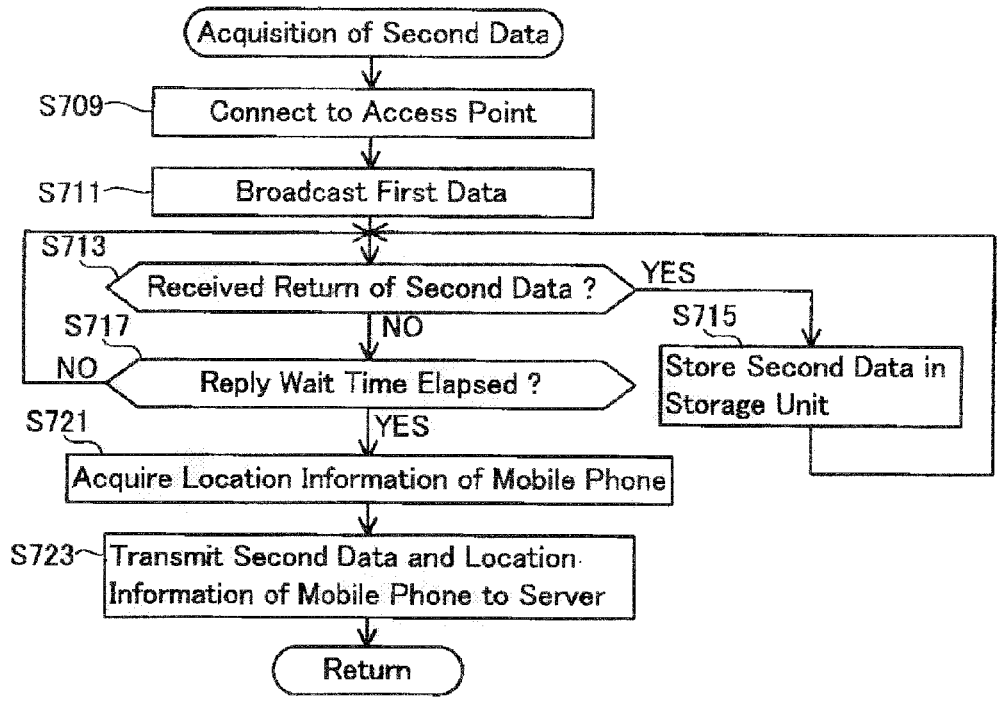
FIG. 11 is a diagram showing a fifth operation flow chart of a mobile phone.
Figure 12:
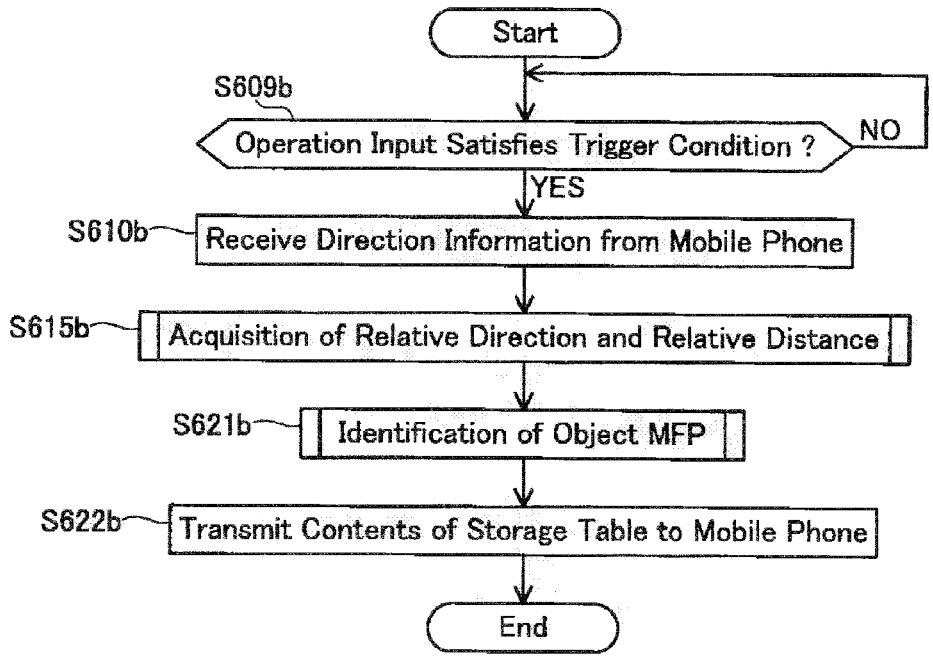
FIG. 12 is a diagram showing a first operation flow chart of a server.
Figure 13:
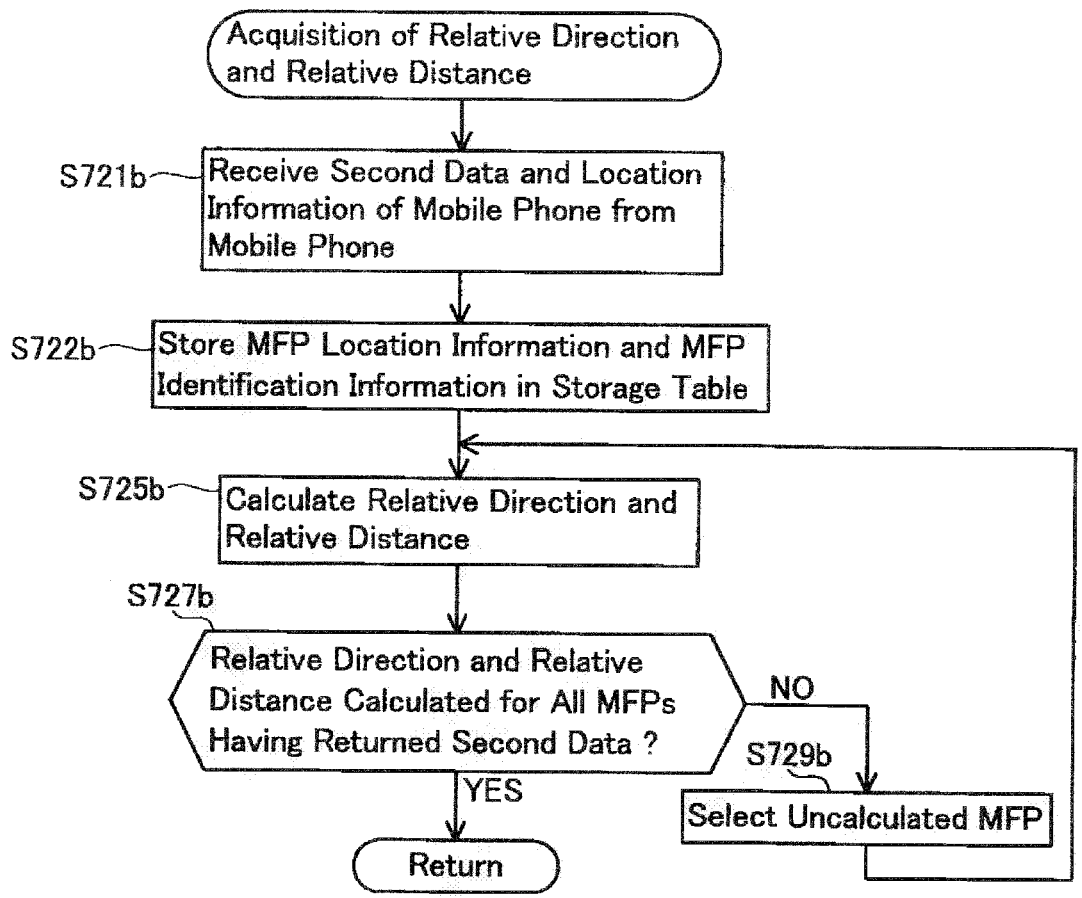
FIG. 13 is a diagram showing a second operation flow chart of a server.

A second embodiment will now be described. In the second embodiment, a server 71 is used in the communication system 1 illustrated in FIG. 1. Processing that is performed by the mobile phone 10 in the first embodiment is divided in the second embodiment between a server and a mobile phone 10. A storage unit 73 of the server 71 stores a storage table TB1. Operations of the communication system 1 according to the second embodiment will now be described with reference to FIGS. 10 to 13. FIGS. 10 and 11 show flows performed by the mobile phone 10. FIGS. 12 and 13 show flows performed by the server 71.

Flows performed by the mobile phone 10 will be described. In S609 in FIG. 10, a CPU 11 of the mobile phone 10 determines whether or not an operation unit (an acceleration sensor 26, a compass unit 25, a button input unit 17, or the like) has received an operation input by a user. When an operation input has not received (S609: NO), the CPU 11 returns to S609. On the other hand, when an operation input has been received (S609: YES), the CPU 11 advances to S613. In S613, the CPU 11 transmits information regarding the operation input (information indicating an orientation acquired by the compass unit 25, an acceleration measured by the acceleration sensor 26, image data acquired by the camera unit 27, or the like) to the server 71 via wireless communication 200, an access point 62, and the Internet 70.

In S614, the CPU 11 uses an API to acquire information indicating the orientation of the mobile phone 10 from the compass unit 25. The CPU 11 then calculates direction information and stores the same in the storage unit 12. The CPU 11 causes the wireless transceiver unit 15 to execute processing for transmitting the direction information to the server 71 via wireless communication 200, the access point 62, and the Internet 70.

In S615, the CPU 11 executes acquisition and transmission of second data. Detailed contents of the flow for acquiring and transmitting the second data will now be described with reference to FIG. 11. In S709, the CPU 11 performs wireless communication 200 conforming to an infrastructure mode with the access point 62. In S711, using the wireless transceiver unit 15, the CPU 11 broadcasts first data by wireless communication 200 conforming to the wireless LAN infrastructure mode. Consequently, first to third MFPs 51 to 53 receive the first data via an access point. In S713, the CPU 11 determines whether the second data has been returned from the first to third MFPs 51 to 53. Specifically, a determination is made on whether or not data including the identification information of the mobile phone 10, MFP identification information (IP address), and return information has been received. When the second data has been received (S713: YES), the CPU 11 advances to S715 to temporarily store the second data in the storage table TB1.

On the other hand, when the second data has not been received (S713: NO), the CPU 11 advances to S717 to determine whether or not a reply wait time for the second data has elapsed. When the reply wait time had not elapsed (S717: NO), the CPU 11 returns to S713, and when it had elapsed (S717: YES), the CPU 11 advances to S721. In S721, the CPU 11 acquires location information of the mobile phone 10 calculated by the GPS unit 24. The acquired location information of the mobile phone 10 is temporarily stored in the storage unit 12. In S723, the CPU 11 causes the wireless transceiver unit 15 to execute processing for transmitting the second data and the location information of the mobile phone stored in the storage unit 12 to the server 71. The acquisition flow of second data is finished and a return is made to S621 (FIG. 10).

In S621, the CPU 11 receives contents of the storage table TB1 from the server 71. In S623, based on the storage table TB1, the CPU 11 displays options (buttons presenting MFP names) indicating MFPs that are selection candidates (MFPs having information stored in the storage table TB1 in association with the flag 243) on a panel 18 of the mobile phone 10. In S625, when any one of the options is specified by a user input to the operation unit, the CPU 11 decides the MFP indicated by the specified option to be an object MFP. In S627, the CPU 11 reads out the MFP identification information 230 (IP address) of the object MFP from the storage table TB1 and executes data communication with the object MFP. The flow performed by the mobile phone 10 is then finished.

A flow performed by the server 71 will be described. In S609*b* in FIG. 12, a CPU 72 of the server 71 determines whether or not an operation input received from the mobile phone 10 satisfies the trigger condition. When the trigger condition is not satisfied (S609*b*: NO), the CPU 72 returns to S609*b*, and when the trigger condition is satisfied (S609*b*: YES), the CPU 72 advances to S610*b*. In S610*b*, the CPU 72 receives the direction information from the mobile phone 10.

In S615*b*, the CPU 72 executes a flow for acquiring the relative direction and the relative distance. Detailed contents of the flow for acquiring the relative direction and the relative distance will be described with reference to FIG. 13. In S721*b*, the CPU 72 receives the second data and location information of the mobile phone 10 from the mobile phone 10 and causes the storage unit 73 to store the same. In S722*b*, the CPU 72 extracts the IP addresses 232 of the MFPs and the MFP location information 240 from the second data. The CPU 72 associates the MFP location information 240 and the IP address 232 to each MFP and causes the storage table TB1 of the storage unit 73 to store the same. In S725*b*, the CPU 72 calculates the relative direction 241 and the relative distance 242. The calculation of the relative direction 241 and the relative distance 242 is performed based on the location information of the mobile phone 10 and the MFP location information 240 stored in the storage unit 73. The calculated relative direction and relative distance are temporarily stored in the storage table TB1 as the relative direction 241 and the relative distance 242 of the MFP.

In S727*b*, the CPU 72 determines whether or not the relative direction 241 and the relative distance 242 have been calculated for all MFPs which have returned the second data.

If calculated (S727*b*: YES), the CPU 72 ends the flow, and if not calculated (S727*b*: NO), the CPU 72 advances to S729*b*. In S729*b*, the CPU 72 selects an MFP for which the relative direction and the relative distance have not been calculated and then returns to S725*b*. Accordingly, the relative direction 241 and the relative distance 242 can be acquired for all MFPs which have returned the second data.

Returning now to the flow shown in FIG. 12, in S621*b*, the CPU 72 identifies the object MFP. A flow for identifying an object MFP will be described with reference to FIG. 4. The CPU 72 of the server 71 performs processing for sorting the selection priorities 220 of MFPs in S311 to S315. When the step of S315 is finished, the flow for identifying the object MFP is finished and the CPU 72 advances to S622*b* (FIG. 12). In FIG. 4, the steps of S317 and S319 are not executed. In S622*b*, the CPU 72 causes a communication unit 74 to execute processing for transmitting contents of the storage table TB1 after sorting to the mobile phone 10. The flow performed by the server 71 is then finished.

As described above, with the communication system 1 according to the illustrated example of the second embodiment, parts of processing for acquiring a relative direction and a relative distance, processing for identifying an object MFP, or the like can be performed by the server 71. As a result, a burden of processing on the mobile phone 10 and the first to third MFPs 51 to 53 can be reduced.

While specific embodiments of the present invention have been described in detail above, such description is for illustrative purposes only and is not intended to limit the scope and claims of the invention. Techniques described in the claims of the invention include various modifications and changes made to the specific examples illustrated above.

In the second embodiment, various paths may exist along which the server 71 acquires the MFP location information 240, the MFP identification information 230, location information of the mobile phone 10, and the like. In the second embodiment, while the server 71 receives second data including the MFP location information 240 and the MFP identification information 230 from the mobile phone 10, such a mode is not restrictive. For example, MFP location information 240 for each of the first to third MFPs 51 to 53 may be stored in advance in the storage unit 73 of the server 71. The server 71 may receive only location information of the mobile phone 10 from the mobile phone 10. In this case, the server 71 may be configured to search MFPs existing around the mobile phone 10 by comparing the location information of the mobile phone 10 with the MFP location information 240. Accordingly, by transmitting the location information of the mobile phone 10 to the server 71, MFP location information 240 and identification information of MFPs existing around the mobile phone 10 can be received from the server 71. As a result, since the first to third MFPs 51 to 53 need not include a location measuring device such as the GPS unit 44, a simplified configuration can be achieved.

Methods of deciding a relative direction 241 are not limited to the method of S125. Alternatively, the relative direction 241 may be identified based on radio wave characteristics when the mobile phone 10 receives data from the MFP. Specific examples include providing the mobile phone 10 with a directional antenna to obtain a relative direction 241 of an MFP transmitting radio waves. A method is conceivable in which the mobile phone 10 includes a plurality of antennas, and a relative direction 241 of an MFP transmitting radio waves can be obtained from a time lag in radio wave reception. As a result, a relative direction 241 can be acquired even when location information of the mobile phone 10 or MFP location information 240 cannot be acquired.

Methods of deciding a relative distance 242 are not limited to the method of S125. A relative distance 242 may be calculated based on a radio field intensity of wireless communication. As a result, a relative distance 242 can be acquired even when location information of the mobile phone 10 or MFP location information 240 cannot be acquired.

Embodiments of the present teachings is not limited to the configuration in which the mobile phone 10 receives information indicating a physical location from an MFP, and stores the information in the storage table TB1 without modification as the MFP location information 240 of the MFP. Alternatively, the physical location received from the MFP may be converted to any data format that can easily be processed by the mobile phone 10, and then may be stored as the MFP location information 240 in the storage table TB1.

In S313, the CPU 11 determines the number of MFPs (MFPs existing in front of the user of the mobile phone 10) of which a difference between a direction indicated by a horizontal component of the relative direction 241 and a direction indicated by a horizontal component of the direction information is less than 90 degrees (in other words, in a direction pointed by the speaker 3 side tip of the mobile phone 10 or in front as seen from the user of the mobile phone 10). The MFPs counted in S313 are not limited to those with the difference between the direction indicated by the horizontal component of the relative direction 241 and the direction indicated by the horizontal component of the direction information is less than 90 degrees (e.g., within 90 degrees to the right side from a direction pointed by the speaker 3 side tip of the mobile phone 10). MFPs within minus 90 degrees (e.g.) may also be counted (e.g., within 90 degrees to the left side from a direction pointed by the speaker 3 side tip of the mobile phone 10). The difference between the direction indicated by the horizontal component of the relative direction 241 and the direction indicated by the horizontal component of the direction information is not limited to 90 degrees; it may be an angle smaller than 90 degrees (e.g. 60 degrees). 60 degrees is an angle included within 90 degrees.

A device having a communication function such as a notebook personal computer can be used instead of the mobile phone 10. In this case, the communication program 28 may be various driver software installed in the notebook personal computer. The number of MFPs connected to the communication system need not be limited to three and a large number of MFPs may exist. Communication between the access point 62 and the first to third MFPs 51 to 53 is not limited to a wireless LAN method and a wired LAN method may be used instead.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

Each program may be constituted by a single program module or by a plurality of program modules. Each example may adopt another replaceable configuration which is within the context of the present invention. Adoptable configurations include a computer (the CPU 11 or the like) which executes processing based on a program (the communication program 28 or the like), a computer which executes processing based on a program other than an image processing program such as an operating system and other applications, a hardware configuration (the panel 18 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A computer-readable recording device storing a computer program including instructions for causing a computer of a mobile device to operate as:
   - a selecting module that selects, based on first information, second information and third information, a particular device being substantially located in a specific direction indicated by the third information from a plurality of candidate devices on a wireless network,
     - the first information indicating a physical location of the mobile device,
     - the second information indicating physical locations of the plurality of candidate devices,
     - the third information indicating the specific direction which had been specified by a predetermined operation received at an operation unit configured to receive operations on the mobile device by a user,
     - the specific direction being a direction with a location of the mobile device as reference;
   - a controlling module that controls a communication unit that is configured to communicate using the wireless network such that the communication unit communicates with the particular device selected by the selecting module; and
   - a calculation unit that calculates a plurality of relative directions with respect to the plurality of candidate devices based on the first information and the second information, the plurality of relative directions being directions with the location of the mobile device as reference,
   - wherein the selecting module selects the particular device by comparing the specific direction and the plurality of relative directions.

2. The computer-readable recording device as in claim 1, wherein
   the operation unit comprises an acceleration sensor that measures an acceleration applied to the mobile device when the mobile device is operated by the user, and
   in a case where the acceleration measured by the acceleration sensor exceeds a threshold value, the computer is caused to operate such that the operation unit had received the predetermined operation.

3. The computer-readable recording device as in claim 1, wherein
   the operation unit comprises an acceleration sensor that measures an acceleration applied to the mobile device when the mobile device is operated by the user, and
   in a case where the acceleration measured by the acceleration sensor exceeds a threshold value, the computer is caused to operate such that the selecting module selects the particular device being substantially located in the specific direction indicated by the third information.

4. The computer-readable recording device as in claim 1, wherein
   in a case where the operation unit receives the predetermined operation, the computer is caused to operate such that the selecting module selects the particular device based on a direction indicated by a compass provided in the mobile device.

5. The computer-readable recording device as in claim 1, wherein
in a case where the operation unit receives the predetermined operation, the computer is caused to operate such that the selecting module obtains the first information.

6. The computer-readable recording device as in claim 1, wherein
in a case where the operation unit receives the predetermined operation, the computer is caused to operate such that the selecting module obtains the second information.

7. The computer-readable recording device as in claim 6, wherein
the computer is caused to operate such that the selecting module obtains the second information from the plurality of candidate devices on the wireless network.

8. The computer-readable recording device as in claim 1, wherein
the computer is caused to operate such that the selecting module selects only one particular device.

9. The computer-readable recording device as in claim 1, wherein
the computer is caused to operate such that, in a case where the selecting module selects two or more particular devices, the controlling module controls the communication unit such that the communication unit communicates with one particular device designated by the user from the two or more particular devices.

10. A method for controlling a mobile device, the method comprising:
selecting, based on first information, second information and third information, a particular device being substantially located in a specific direction indicated by the third information from a plurality of candidate devices on a wireless network,
the first information indicating a physical location of the mobile device,
the second information indicating physical locations of the plurality of candidate devices,
the third information indicating the specific direction which had been specified by a predetermined operation received at an operation unit of the mobile device,
the specific direction being a direction with a location of the mobile device as reference,
the operation unit being configured to receive operations on the mobile device by a user;
controlling a communication unit that is configured to communicate using the wireless network such that the communication unit communicates with the particular device selected by the selecting module; and
calculating a plurality of relative directions with respect to the plurality of candidate devices based on the first information and the second information, the plurality of relative directions being directions with the location of the mobile device as reference,
wherein the selecting step selects the particular device comparing the specific direction and the plurality of relative directions.

11. A mobile device comprising:
a selecting module that selects, based on first information, second information and third information, a particular device being substantially located in a specific direction indicated by the third information from a plurality of candidate devices on a wireless network,
the first information indicating a physical location of the mobile device,
the second information indicating physical locations of the plurality of candidate devices,
the third information indicating the specific direction which had been specified by a predetermined operation received at an operation unit of the mobile device,
the specific direction being a direction with a location of the mobile device as reference,
the operation unit being configured to receive operations on the mobile device by a user;
a controlling module that communicates with the particular device selected by the selecting module, and
a calculation module calculates a plurality of relative directions with respect to the plurality of candidate devices based on the first information and the second information, the plurality of relative directions being directions with the location of the mobile device as reference,
wherein the selecting module selects the particular device by comparing the specific direction and the plurality of relative directions.

12. The computer-readable recording device as in claim 1, wherein
the plurality of candidate devices is devices comprising a printing function,
the mobile device is a mobile phone, and
the communication unit communicates data including print data with the particular device.

13. The computer-readable recording device as in claim 1, wherein
the operation unit comprises a microphone, and
in a case where a voice signal is measured bv the microphone, the computer is caused to operate such that the selecting module selects the particular device being substantially located in the specific direction indicated bv the voice signal.

14. A computer-readable recording device storing a computer program including instructions for causing a computer of a mobile device to operate as:
a selecting module that selects, based on first information, second information and third information, a particular device being substantially located in a specific direction indicated by the third information from a plurality of candidate devices on a wireless network,
the first information indicating a physical location of the mobile device,
the second information indicating physical locations of the plurality of candidate devices,
the third information indicating the specific direction to which a camera unit provided in the mobile device had been directed, in a case where an operation is received at an operation unit configured to receive operations on the mobile device by a user,
the specific direction being a direction with a location of the mobile device as reference; and
a controlling module that controls a communication unit that is configured to communicate using the wireless network such that the communication unit communicates with the particular device selected by the selecting module,
wherein in a case where a calculation unit calculates a plurality of relative directions with respect to the plurality of candidate devices based on the first information and the second information, the selecting module selects the particular device by comparing the specific direction and the plurality of relative directions,
the plurality of relative directions being directions with the location of the mobile device as reference.

15. A computer-readable recording device storing a computer program including instructions for causing a computer of a mobile device to operate as:

a selecting module that selects, based on first information, second information and modified information, a particular device being substantially located in a specific direction indicated by the modified information from a plurality of candidate devices on a wireless network, the first information indicating a physical location of the mobile device, the second information indicating physical locations of the plurality of candidate devices, the modified information being generated by modifying third information based on operations received at an operation unit, the third information indicating a direction which is specified by a direction of a predetermined member provided in the mobile device with a location of the mobile device as reference, the specific direction being a direction with a location of the mobile device as reference;

a controlling module that controls a communication unit that is configured to communicate using the wireless network such that the communication unit communicates with the particular device selected by the selecting module, wherein:

when an operation received at an operation unit is an operation specifying a direction with a location of the mobile device as reference, the selecting module selects the particular device; and in a case where a calculation unit calculates a plurality of relative directions with respect to the plurality of candidate devices based on the first information and the second information, the selecting module selects the particular device by comparing the specific direction and the plurality of relative directions, the plurality of relative directions being directions with the location of the mobile device as reference.

16. A computer-readable recording device storing a computer program including instructions for causing a computer of a mobile device to operate as:

a selecting module that selects, based on first information, second information and third information, a particular device being substantially located in a specific direction indicated by the third information from a plurality of candidate devices on a wireless network, the first information indicating a physical location of the mobile device, the second information indicating physical locations of the plurality of candidate devices, the third information indicating one direction which had been specified by a predetermined operation received at an operation unit configured to receive operations on the mobile device by a user, the specific direction being a direction with a location of the mobile device as reference; and a controlling module that controls a communication unit that is configured to communicate using the wireless network such that the communication unit communicates with the particular device selected by the selecting module, wherein when an acceleration, which is applied to the mobile device when the mobile device is operated by the user and is measured by an acceleration sensor, alters from being equal to or greater than a predetermined value and oriented in the one direction to being equal or greater than the predetermined value and oriented in an opposite direction, the selecting module selects the particular device.

* * * * *